Feb. 2, 1965  S. W. BENGTSSON  3,167,835
LOCKING DEVICES

Filed Oct. 1, 1963  3 Sheets-Sheet 1

INVENTOR.
SIGURD WALTER BENGTSSON
BY
Linton and Linton
ATTORNEYS

Feb. 2, 1965  S. W. BENGTSSON  3,167,835
LOCKING DEVICES

Filed Oct. 1, 1963  3 Sheets-Sheet 2

INVENTOR.
SIGURD WALTER BENGTSSON
BY
Linton and Linton
ATTORNEYS

Feb. 2, 1965  S. W. BENGTSSON  3,167,835
LOCKING DEVICES

Filed Oct. 1, 1963  3 Sheets-Sheet 3

INVENTOR.
SIGURD WALTER BENGTSSON
BY
*Linton and Linton*
ATTORNEYS

United States Patent Office 3,167,835
Patented Feb. 2, 1965

3,167,835
LOCKING DEVICES
Sigurd Walter Bengtsson, Rattgatan 6, Goteborg, Sweden
Filed Oct. 1, 1963, Ser. No. 312,969
Claims priority, application Sweden, Oct. 12, 1962,
10,928/62; May 20, 1963, 5,573/62
3 Claims. (Cl. 24—230)

The present invention relates to a locking device for releasable inter-connection of two parts. As examples, two parts of an article of dress, two parts of a handbag, viz. the cover and the side wall of the bag, and of other articles may be mentioned. More particularly, the invention relates to such locking devices as consist of two locking members each adapted to be connected to one of said parts, one of said members having a fastening head with at least one resilient locking bolt extending from a shoulder on said head, and the other of said members consisting of a locking socket into which the locking bolt is adapted to be inserted, said bolt having at its free end portion an offset adapted by the spring action of the bolt to engage with a locking edge on the socket, in which position the shoulder bears on the edge portion of the opening of the socket through which the locking bolt has been inserted. A locking device of this type is described and shown in my pending patent application Serial No. 118,352 filed June 20, 1961, now Patent No. 3,120,971, In many cases, such as in the use of these locking devices for articles of dresses, in darkness or at other occasions, the locking members are not well visible so that, when said members are to be interconnected, the locking bolt will not obtain correct position in relation to the locking socket for such interconnection.

The present invention has for its primary object to eliminate this drawback and facilitate the correct inter-connection of the two locking members.

Another object of the present invention is to provide such guiding means for the locking bolt as will also serve as a support for the bolt and prevent too great stresses thereon.

A further object of the present invention is to provide guiding means which will diminish friction between the bolt and the inner wall of the locking socket in the insertion of the bolt into said socket and hold the two locking members immovably interconnected in their locking position.

Still an additional object of the present invention is to provide locking devices of said kind which will be of very simple construction, cheap in manufacture but efficient in operation.

According to an important feature of the present invention, at least one guide arm extends from said shoulder laterally of the locking bolt, said arm being formed integrally with the head and the locking bolt, and having an outer surface facing from the locking bolt and adapted to co-operate with a corresponding inner surface of the locking socket, for guiding the locking bolt in the locking socket to locking position in which the whole length of the guide arm is received by said socket. This arrangement permits a considerable misplacement of the two locking members in relation to each other since by the aciton of the guide arm the locking bolt will be moved to its correct locking position in the locking socket. Said guide arm also constitutes a protection for the locking bolt in careless manipulation of the locking device.

In a suitable form of the present invention the resilient portion of the bolt to the rear of the offset in a direction substantially perpendicular to two opposite walls of the socket, has considerably less transverse dimension than the distance between these walls in the same direction, whereas the guide arm has such a cross-sectional area that the arm in the locking position of the device lies close to said walls and a side wall connecting said opposite walls of the socket. Hereby it is achieved that in the first major portion of the movement of the locking bolt in the locking socket, said bolt with a relatively slight pressure or none at all will contact the inner wall of said socket, and in spite of this fact owing to the support of the guide arm or arms against the inner wall of the locking socket in interlocking position, a steady connection between the two locking members is obtained.

A locking device of this kind in certain cases may have two resilient locking bolts connected with said head, a slot or opening being provided between the bolts. In the use of such an embodiment it may occur that by misinsertion of the locking bolts, one of these bolts will be located on the inner side and the other bolt on the outer side of the locking socket, the wall of which is wedged in the slot between the bolts. Such an embodiment according to the present invention has two guide arms between which the locking bolts extend from the shoulder of the head, the outer surfaces of the guide arms facing from the locking bolts serving as guide surfaces tapering in wedge-shape from said shoulder towards each other. Normally these two guide arms will guide the locking bolts to their locking position but if in a misinsertion, the wall of the socket is received between the locking bolts and tends to break off the latter, a large portion of the breaking forces will be adsorbed by the guide arms.

The present invention will be described more in detail with reference to some embodiments shown as examples in the accompanying drawings.

Figure 1:
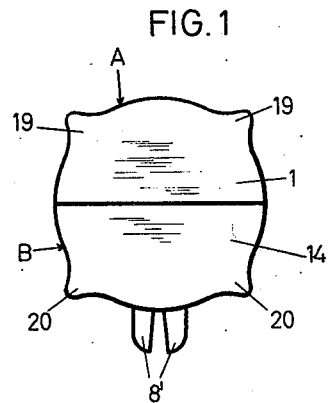
FIG. 1 is a front view of a first embodiment of the locking device with the locking members in interlocking position.
Figure 4:
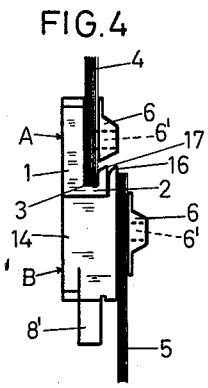
Figure 2:
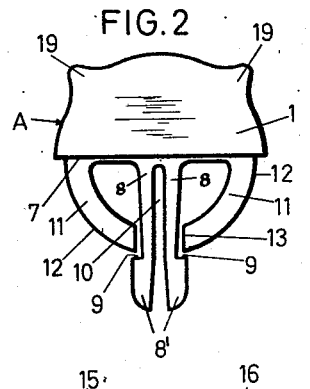
FIG. 2 and FIG. 3 are front views of each of the locking members disengaged from each other.
Figure 5:
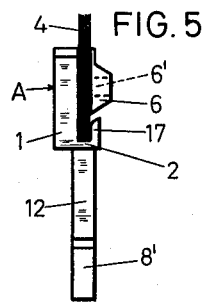
Figure 3:
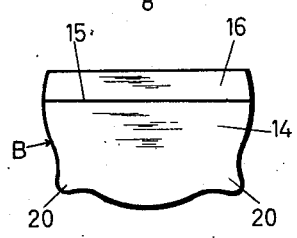
Figure 6:
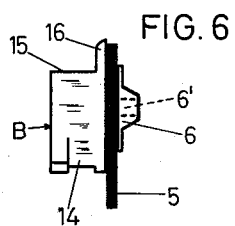

FIGS. 4 to 6 inclusive are side views of the locking members corresponding to FIGS. 1 to 3 inclusive, said members being attached to the parts to be interconnected by the locking device.

Figure 7:
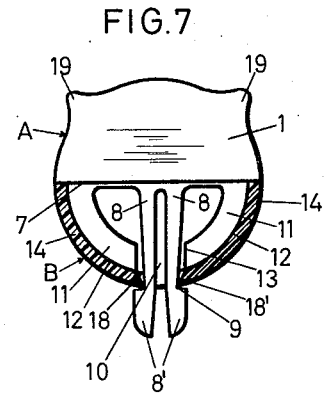

FIG. 7 is a view corresponding to FIG. 1 but with the locking socket in vertical section.

FIG. 8 is a front view of a second modified embodiment of the locking device with two locking members interlocked.

FIG. 9 is a side view of the same locking device.

FIG. 10 is a front view corresponding to FIG. 8 with the locking socket in longitudinal section.

FIG. 11 is a side view of the locking device with the locking socket in longitudinal section.

FIG. 12 is a front view of locking member formed with the locking bolt and the guide arms of this second embodiment.

FIG. 13 is a vertical section of this locking member on the line XIII—XIII of FIG. 12.

FIG. 14 is a front view of the locking socket of this second embodiment of the present invention.

FIG. 15 is a vertical section on the line XV—XV of FIG. 14.

FIG. 16 is a plan view of the same locking socket.

FIG. 17 is a front view of the locking device according to a third modified embodiment of the present invention.

FIG. 18 is a side view of this third embodiment with the locking socket in vertical section.

Figure 19:
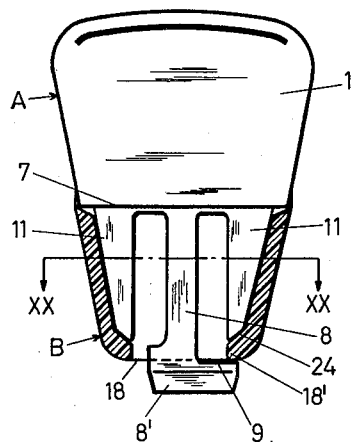
Figure 20:
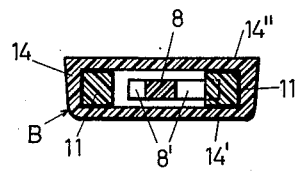

FIG. 19 is a front view of the locking device according to a fourth modified embodiment of the invention, the locking socket being shown in vertical section, and FIG. 20 is a cross section on the line XX—XX of FIG. 19.

Referring to the drawings in detail, in the first embodiment the locking device according to FIGS. 1–7 comprises two locking members A and B, one A of which is provided with a fastening head 1 having a substantially semicircular shape and a diametrical flange 2 forming a groove 3 in which an edge portion of the part or base 4, to which this locking member A is to be attached, is received. Fastening means are provided for securing the member A to the part 4. These fastening means may be of a kind previously known and consist of one or more pins 6' formed integrally with the head 1 and provided each with a ratchet tooth (not shown) projecting into the hole of an anchoring sleeve 6 at the opposite side of the part 4 in relation to the head 1, said sleeve having a corresponding ratchet tooth for engagement with the pin. The fastening means may, however, be of any other suitable kind. The flange 2 constitutes on the side opposite to the groove 3 a substantially diametrically positioned plane surface or shoulder 7, and from the central portion of this shoulder two locking bolts 8 project in directions substantially perpendicular to said shoulder. The locking bolts have offsets 9, the offset portions 8' of the bolts facing in opposite directions from each other, and between the bolts a slot 10 is provided permitting the free ends 8' of the bolts to be bent towards each other owing to the resilient character of the bolts, as required in the operation of the locking device.

According to the first modification of the present invention, a curved guide arm 11 at each end of the shoulder 7 projects from this shoulder, and between these guide arms the rear portions of the locking bolts 8 are positioned. The shape of the outer sides 12 of the guide arms corresponds to the inner side of the locking socket 14 hereinafter described. Said outer sides 12 taper or converge towards the locking bolts 8 at points to the rear of the offsets 9 of the bolts permitting the necessary movements of the free ends 8' of the locking bolts for the normal function in which the bolts do not contact the free ends 13 of the guide arms. In the joint position of the locking members A and B the guide arms 11 in their entirety are located within the locking socket 14.

The second locking member B of the locking device comprises the locking socket 14 above mentioned, said socket having a substantially semicircular shape and forming a complement to the head 1, so that they together will form a button of circular, oval or other suitable shape, as shown by FIG. 1. The side 15 of the socket 14 facing the shoulder 7 of the fastening head and extending substantially diametrically has a flange 16 forming substantially right angle to the side 15 and constituting, in cooperation with the side wall 17 of the groove 3, guiding means for the locking members A and B in a plane substantially parallel with the front sides of the head 1 and the socket 14, said guiding means 16, 17 being known per se.

The guide arms 11 complete in an essential respect said guiding means 16, 17 because the guide surfaces 12 of said arms exert guiding action in planes which are substantially perpendicular to said flange 16 and side wall 17. Thus in the interlocking of the members A and B it will not be necessary to be carefully attentive to the central insertion of the locking bolts into the socket. In fact, owing to the guide arms 11 a lateral misinsertion to the right or to the left of at least 1 cm. in respect of FIGS. 2 and 3 is permitted since the arms 11 will guide the locking bolts 8 into the socket 14 so that the free ends 8' of the bolts are moved out through the fore opening 18 of the socket and snap to engagement with opposite edges 18' of said opening locking the two locking members to each other, as shown by FIG. 7. The free ends 8' of the locking bolts extending out of the opening 18 serve as small handles for unlocking the device, but this is previously known.

For the manipulation of the locking members A and B, the head 1 and the socket 14 may be formed with suitable projections 19 and 20.

The locking socket 14 may be secured to the part or base 5 by fastening means 6, 6' of the same kind as above described.

The locking device according to the first modification of FIGS. 1 to 7, is constructed as a fastener designed to be used as a button or the like for dress articles, but the exterior shape of the locking members A and B may, of course, be varied within wide limits according to individual wishes. It may, however, be mentioned that this device also may be used with advantage for hand-bags and receptacles of different kinds.

The main object of the arms 11 is to serve as guiding means in the interconnection of the two locking members A and B, but they also constitute a protection for the locking bolts 8. If, for example, by misdirecting the wall of the socket 14 enters the slot 10 between the bolts, the ends 13 of the arms 11 will constitute supports for the bolts and prevent too great stresses on the bolts.

The locking device is made from semirigid plastic material on which in respect of elasticity the demand should be placed that the bolt or bolts 8 have an adequate resilience to fill their function. The head 1 with the locking bolts and the ratchet pin or pins 6' are made in a single piece, and the socket 14 with the ratchet pin or pins 6' thereof are made in a single second piece.

The locking devices according to the other embodiments of the present invention have essential characterizing features common with the embodiments of FIGS. 1 to 7 inclusive, above described, and for details common to all embodiments the corresponding numeral references are used in the drawings.

In the embodiments of FIGS. 8 to 20 inclusive a single locking bolt 8 is provided.

In the embodiments of FIGS. 8 to 16 and 17 to 18, this locking bolt is provided for resilient movement in a plane substantially perpendicular to the plane rear side 1' of the head 1, whereas said bolt in a plane parallel with the side 1' of the head is substantially rigid.

In the embodiment of FIGS. 19 to 20, the free end of the locking bolt 8 is resiliently movable in the plane last mentioned.

In all of these mentioned embodiments, on each side of the locking bolt 8 a guide arm 11 projects from the shoulder 7, the outer sides 12 of the arms 11 facing from the locking bolt converging towards the free end 8' of said bolt 8. The free ends 13 of the guide arms 11 are rounded. Each guide arm is separated from the locking bolt by an intermediate space or slot 25 of suitable width.

The inside of the locking socket 14 tapers from the surface 15 at the entrance opening to the opposite or fore end of the socket.

In the embodiments of FIGS. 8 to 16 and 19 to 20 the latter end of the locking socket is open as shown at 18, and the free end portion 8' is delimited by the offset 9 in locking position extends through this open end and by said offset it can co-operate with a locking edge 18' of the fore opening 18 (FIGS. 11 and 20).

In the embodiment of FIGS. 17 and 18 the fore end of the socket 14 is closed by an end wall 21, whereas an aperture 22 is provided in the front wall 14' forming a locking edge 18' adapted to engage with a cylindrical projection 8' on the locking bolt.

As shown by FIG. 11, in the first embodiment the guide arm 11 in a direction perpendicular to the rear wall 14" of the socket has a transverse dimension corresponding to the distance between the insides of the front and rear walls 14' and 14" of the socket 14, whereas the transverse dimension of the locking bolt 8 in the same direction is substantially less and permits the resilient bolt to swing in a plane with which the longitudinal axis of the locking bolt coincides and which is substantially perpendicular to the rear socket wall 14". When inserting the locking bolt into the socket, the end portion 8' of the bolt may be guided by a groove 23 in the inside of the front wall 14' of the socket, the depth of said groove decreasing towards the fore end 18 or 21 of the locking socket so that the resilient locking bolt is gradually set. In this movement the end portion 8' of the locking bolt is swung rearwardly until it has passed through the socket opening 18 and the bolt due to its elasticity is swung towards the front wall 14' and the offset 9 in co-operation with the locking edge 18' of the socket 14 locks the members A and B in relation to each other. A rearwardly directed pressure against the end portion 8' of the bolt and a subsequent displacement of this portion into the socket disengages the locking members from each other. By the above description it may be evident that in the interconnection of the members A and B the locking bolt does not exert any other friction against the locking socket than that one required to gradually set the locking bolt which only in the final movement of the bolt immediately before its unstressing with its largest spring pressure bears against the inside of the locking socket. The guide arms 11 and also the locking socket 14 may be practically rigid, and said arms fit in the socket and will also lie close to the side walls connecting the front and rear walls 14', 14'' of the locking socket so that the locking mebers A and B will be immovably connected with each other.

In the embodiments of FIGS. 8 to 16 inclusive the locking bolt 8 has a considerably greater length than the guide arms 11 and extends in locking position through the fore end opening 18 of the locking socket, whereas said arms in their entirety are enclosed by the socket. The locking bolt and these guide arms may, however, have substantially the same length as in the embodiment of FIGS. 17 and 18 in which the locking edge 18' is formed by the edge of the aperture 22 in the front wall 14' of the socket, the guide groove 23 for the projection 8 forming the offset 9 of the bolt leading to said aperture. This projection may, for example, be cylindrical with a rounded extreme end as shown in the drawing. The manner of operation is substantially the same as that of the embodiments of FIGS. 8 to 16.

In the two latter embodiments, the pressure on the locking bolt for unlocking is exerted substantially perpendicular to the rear wall 14'' of the locking socket.

The embodiment of FIGS. 19 and 20 is similar to that of FIGS. 8 to 20 but differs from the latter by the fact that the free end 8' of the locking bolt is movable in a plane which is substantially parallel with the rear wall 14'' of the socket 14. In the insertion of the locking bolt 8 and guide arms 11 into the locking socket, the free end portion 8' of the bolt will cooperate with a cam surface 24 at the fore opening 18 of the socket so that said end portion is swung laterally and the locking bolt is set, and after the end portion 8' has passed out through the opening 18, the bolt offset 9 will automatically engage with the locking edge 18', as shown by the drawing. It is evident from FIG. 20 that the transverse dimension of the arms 11 in a direction perpendicular to the rear wall 14'' of the socket, as in the other embodiments, corresponds to or is slightly less than the inner distance between the walls 14' and 14'', and in interlocking position of the members A and B each arm by three of its longitudinal sides lies close to the inner wall of the locking socket. The corresponding transverse dimension of the locking bolt is considerably less than said distance, so that only the offset end portion 8' of the locking bolt in the insertion of the bolt and arms into the socket in the final portion of its insertion movement at 24 will contact the inner wall of the socket for setting the bolt.

Each locking member A, B also in these latter embodiments is preferably made in one casting of suitable plastic material.

The present invention is not restricted to the embodiments described and shown but the details of the members A and B of all embodiments shown may have other suitable shapes without departing from the spirit of the invention.

What I claim is:

1. A locking device for releasable interconnection of two parts and comprising two locking members and being directly hand operable, a head portion on the first of these locking members being adapted to be secured to the first of said parts, a shoulder formed by said head portion, at least one resilient locking bolt extending from said shoulder, said locking bolt, having a resilient locking offset, the second of said locking members consisting of a locking socket having a locking edge portion and being adapted to be secured to the second of said parts, said socket having a through hole, the locking bolt being adapted to be inserted through an entrance end of said hole, and extending in locking position out through the opposite exit end of the through hole said locking offset being adapted by its inherent spring action to engage with said locking edge portion of the socket surrounding the entrance end of the hole after insertion of the locking bolt in the socket so as to releasably lock said members in relation to each other, the shoulder of the fastening head bearing on the end of the socket surrounding the entrance end of the hole, in this locking position, at least one guide arm extending from said shoulder and being positioned collaterally with the locking bolt, said guide arm being practically rigid and being formed integrally with said head and locking bolt, a guide surface formed by a longitudinal side of said arm opposite to the locking bolt, said guide surface converging substantially towards the locking offset of the bolt and being adapted to cooperate with the wall of the hole of the socket for guiding the locking bolt to its locking position, and said guide arm being located entirely within the socket in said locking position.

2. A locking device for releasable interconnection of two parts and being directly hand operable and comprising two locking members, a head portion on the first of said locking members, said head portion being adapted to be secured to the first of said parts, a shoulder formed by this head portion, a single resilient locking bolt extending from said shoulder, and being a resilient locking offset the second of said locking members consisting of a socket, this socket being adapted to be connected to the second of said parts to be releasably interconnected, said socket having a through hole, the locking bolt being adapted to be inserted through an entrance end of said hole, and extending in locking position through the opposite exit end of said through hole, said socket having locking edge portions, said locking bolt being adapted by the inherent spring action of the bolt to engage with said locking edge portion of the locking socket surrounding the exit of the through hole after insertion of the locking bolts into the socket so as to releasably connect the locking members to each other, two substantially rigid guide arms extending from said shoulder, said locking bolt being longer than the guide arms and extending from said shoulder between said guide arms collaterally with the arms, longitudinal guide surfaces formed on sides of the guide arms facing from each other, said guide surfaces converging from said shoulder towards each other and being adapted in co-operation with the wall of said hole of the socket to guide the locking bolts to locking position and said guide arms in locking position being located entirely in the socket.

3. A locking device as claimed in claim 2 wherein the transverse dimension of said locking bolt to the rear of the locking offset in a direction substantially perpendicular to two opposite walls of the hole of the socket is substantially less than the distance between these walls in the same direction and wherein the guide arms have such a cross-sectional area that in the locking position of the locking members they are located substantially close to said walls and to an auxiliary side wall of the socket connecting the first-mentioned two side walls.

References Cited by the Examiner

UNITED STATES PATENTS

| | | | |
|---|---|---|---|
| 10,436 | 1/54 | Ware | 24—230 |
| 707,682 | 8/02 | Fairbrother | 24—230 |
| 2,096,319 | 10/37 | Churchill. | |
| 2,240,012 | 4/41 | Freysinger | 24—230 |
| 2,242,238 | 5/41 | Detrich | 24—230 |
| 2,450,306 | 9/48 | Sickles. | |
| 2,845,672 | 8/58 | Molene | 24—230 |

FOREIGN PATENTS

| | | |
|---|---|---|
| 362,567 | 6/06 | France. |
| 901,042 | 7/45 | France. |
| 266,807 | 10/13 | Germany. |
| 368,334 | 7/20 | Germany. |
| 4,493 | 11/79 | Great Britain. |

DONLEY J. STOCKING, *Primary Examiner.*

UNITED STATES PATENT OFFICE
CERTIFICATE OF CORRECTION

Patent No. 3,167,835                            February 2, 1965

Sigurd Walter Bengtsson

It is hereby certified that error appears in the above numbered patent requiring correction and that the said Letters Patent should read as corrected below.

Column 6, line 10, after "bolt" strike out the comma; line 20, for "entrance" read -- exit --; line 42, for "being" read -- having --; same column 6, line 43, after "offset" insert a comma.

Signed and sealed this 6th day of July 1965.

(SEAL)
Attest:

ERNEST W. SWIDER                               EDWARD J. BRENNER
Attesting Officer                                     Commissioner of Patents